United States Patent [19]

Peterson et al.

[11] 4,111,798

[45] Sep. 5, 1978

[54] SEPARATION OF SOLIDS BY VARYING THE BULK DENSITY OF A FLUID SEPARATING MEDIUM

[75] Inventors: Palmer L. Peterson, Richland, Wash.; James B. Duffy, Brea, Calif.; Richard D. Tokarz, Richland, Wash.

[73] Assignee: Battelle Development Corporation, Columbus, Ohio

[21] Appl. No.: 746,109

[22] Filed: Nov. 30, 1976

[51] Int. Cl.$^2$ ............................................. B03B 5/44
[52] U.S. Cl. .................................. 209/172.5; 209/11; 209/172; 209/173; 252/60
[58] Field of Search ..................... 209/172, 173, 172.5, 209/11; 252/60

[56] References Cited

U.S. PATENT DOCUMENTS

| 2,075,593 | 3/1937 | Sveinsson | 209/173 |
| 2,590,756 | 3/1952 | Colin et al. | 209/173 |
| 2,620,069 | 12/1952 | Wendt | 209/172.5 |
| 2,774,734 | 12/1956 | Rodis et al. | 209/172.5 X |
| 2,879,889 | 3/1959 | Rakowsky | 209/173 |
| 3,702,656 | 11/1972 | Gutterman et al. | 209/173 X |
| 3,822,015 | 7/1974 | Hsieh | 209/173 |

Primary Examiner—Frank W. Lutter
Assistant Examiner—Ralph J. Hill
Attorney, Agent, or Firm—Thomas W. Winland; Barry S. Bissell; Kenneth E. Shaweker

[57] ABSTRACT

A method and apparatus for separating objects having a density greater than a selected density value from objects having a density less than said selected density value. The method typically comprises: (a) providing a separation vessel having an upper and lower portion, said vessel containing a liquid having a density exceeding said selected density value; (b) reducing the apparent density of the liquid to said selected density value by introducing solid, bubble-like bodies having a density less than that of the liquid into the lower portion of the vessel and permitting them to rise therethrough; (c) introducing the objects to be separated into the separation vessel and permitting the objects having a density greater than the apparent density of the liquid to sink to the lower portion of the vessel, while the objects having a density less than said selected density value float in the upper portion of the vessel; and (d) separately removing the higher density objects in the lower portion and the lower density objects in the upper portion from the separation vessel. The apparatus typically comprises: (a) a vessel containing a liquid having a density such that at least part of said objects having a density exceeding said selected density value will float therein; (b) means to place said objects into said vessel; (c) means to reduce the effective density of at least a portion of said liquid to said selected density value, whereby said objects having a density exceeding said selected density value sink into said liquid and said objects having a density less than said selected density value remain afloat, said means to adjust the effective density comprising solid, bubble-like bodies having a density less than said selected density value and means for introducing said bodies into said liquid; and (d) means for separately removing said objects having a density exceeding said selected density value and said objects having a density less than said selected density value from said vessel.

18 Claims, 5 Drawing Figures

SEPARATION OF SOLIDS BY VARYING THE BULK DENSITY OF A FLUID SEPARATING MEDIUM

BACKGROUND

1. Field of Invention

This invention relates to a method and apparatus for separating a mixture of objects according to the density of the individual objects. This invention further relates to means for separating solids of varying densities by use of a fluid separation column. More particularly, the present invention is concerned with a novel separating technique and apparatus in which solid articles having slightly differing densities may be separated by use of a fluid separation column in which density is altered in order to cause the solids of a higher density to be separated from the solids of a lower density due to positive buoyancy of the lower density solids and negative buoyancy of the higher density solids. This invention also relates to a novel method for altering the bulk density of a fluid separation medium. 2. Prior Art For separation of larger objects such as produce, including potatoes and other vegetables, the prior art teaches a buoyancy method of separation in which the rate of ascent of the submerged objects in a brine or other liquid solution is utilized to perform the separation. The produce is injected into a moving current of liquid solution which has a density intermediate to the densities of the objects to be separated. The lower density objects surface first and are removed separately from the higher density objects. This prior art process is limited by the fact that the density of the liquid separating medium cannot be altered or adjusted readily.

Another method for separating larger objects is shown in U.S. Pat. No. 3,822,015 (Hsieh, et al.). The Hsieh patent teaches a method of separating materials of different densities by altering the apparent density (i.e., bulk density) of a fluid separation column. In this prior art method the materials to be separated are placed in the fluid separation column wherein they seek a height position dictated by the buoyancy within the fluid separating column (i.e. a position of neutral bouyancy). The apparent (i.e., bulk) density of the fluid separation column is then changed to a value intermediate to the lower density fraction and the higher density fraction of the materials being separated. The higher density fraction then sinks to the bottom of the fluid separation column due to the negative buoyancy, and the lower density fraction remain afloat. The Hsieh patent teaches certain methods for altering the bulk density of the fluid separation column, including, sparging a gas into the fluid and adding soluble chemicals, immiscible fluids, or other fluids.

The method and apparatus taught by the Hsieh patent have been plagued with several difficulties which have, up to now, prevented commercial success. These difficulties include, hydraulic instability, relative inflexibility and insensitivity of the system, air bubble control problems, geometrical constraints, undesirable frothing problems when chemical additives are present, and maintaining a fixed or constant separation column bulk density.

The present invention successfully overcomes each of the above-stated problems and provides numerous additional advantages which will be apparent from the discussion below.

This invention has as one object the provision of an improved process and apparatus for separating relatively large mesh sized articles according to their density by use of a fluid separating column. A further object of this invention is to provide a process and apparatus in which macroscopic sized solids are separated according to their densities by use of a fluid separating column in which the effective density of the fluid separation medium is varied, causing the higher density objects to have a negative buoyancy and the lower density objects to have a positive buoyancy. Another object is to provide a convenient means for varying the effective density of the liquid separation column such that the cut point for separation can be easily controlled.

Another object of this invention is to provide an improved method and apparatus for causing separation of solids according to their densities using a variable density fluid separating column. A related object is to provide apparatus which causes a variation in the apparent density of the fluid separating column so as to cause the lighter density fraction of the solid articles to float on the fluid separating medium and the heavier density articles to sink.

A still further object of this invention is to provide a more convenient and more sensitive means to alter the effective density of a fluid. A further related object is to provide means to alter the effective density of fluids used in solids handling apparatus to effect a separation of the solids being treated in the apparatus simultaneously with the solids handling and transporting operation.

SUMMARY OF THE INVENTION

In accordance with the present invention there is provided a method for separating objects having a density greater than a selected density value from objects having a density less than said selected density value, typically comprising: (a) providing a separation vessel having an upper and lower portion, said vessel containing a liquid, typically water, having a density exceeding said selected density value; (b) reducing the apparent density of the liquid to said selected density value by introducing solid, bubble-like bodies having a density less than that of the liquid into the lower portion of the vessel and permitting them to rise therethrough; (c) introducing the objects to be separated into the separation vessel and permitting the objects having a density greater than the apparent density of the liquid to sink to the lower portion of the vessel, while the objects having a density less than said selected density value float in the upper portion of the vessel; and (d) separately removing the higher density objects in the lower portion and the lower density objects in the upper portion from the separation vessel.

Typically, said solid, bubble-like bodies are comprised of a thermoplastic resin material, such as, for example, polystyrene or polyethylene and are essentially spherical in shape.

Alternatively, where said liquid is water, said solid, bubble-like bodies may typically be comprised of ice.

Typically, substantially all of said solid, bubble-like bodies are of a smaller size than the smallest of the objects being separated.

If desired, the density of the liquid may typically be increased through the addition of an inorganic salt.

In another preferred embodiment of the invention the apparent density of the liquid may be further reduced by sparging a gas into the lower portion of the vessel.

As an optional feature, any objects having a density exceeding that of said liquid prior to introduction of the solid, bubble-like bodies may be separately removed in a preliminary separation step.

In another optional embodiment the higher density objects in the lower portion of the vessel may be removed by directing them through a port located in said lower portion into a second vessel containing a liquid having a density exceeding that of at least a portion of said higher density objects, whereby the portion of said higher density objects having a density less than that of said liquid may be removed from said second vessel as they float therein. Where at least a portion of the higher density objects have a density exceeding that of the liquid in the second vessel, said portion of objects may optionally be separately removed.

In accordance with another embodiment of the invention there is provided a method of separating articles into a plurality of groupings according to density, comprising the steps of: (a) introducing the articles into a first separation vessel containing a liquid having a density exceeding that of at least a portion of the articles; (b) removing any of the articles which sink in said liquid from said first vessel as one of said groupings; (c) introducing solid, bubble-like bodies having a density less than that of the liquid into a portion of the liquid to reduce the effective density of said liquid to a value below the density of a second grouping of said articles but above the density of a third grouping of said articles, so that said second grouping sinks in the liquid leaving said third grouping afloat; (d) separately removing said third grouping of articles from said first vessel; (e) causing said second grouping of articles to move into a second vessel containing said liquid, but without said solid, bubble-like bodies, whereby said second grouping floats in said liquid; and, (f) separately removing said second grouping of articles from said second vessel.

Another preferred method according to the present invention comprises: (a) introducing a mixture of articles having various densities into a vessel containing a liquid; (b) reducing the effective density of said liquid to a value intermediate to the range of densities of said articles it is desired to separate by introducing solid, bubble-like bodies having a density less than that of said liquid into said liquid, thereby causing separation of said articles through buoyancy effects; (c) removing a first portion of said articles having a density lower than said reduced effective density from the upper portion of said liquid, and separately removing a second portion of said articles having a density exceeding said reduced effective density from the lower portion of said liquid.

In addition to the above-described methods, the present invention comprises apparatus for separating according to density a mixture of objects having a density exceeding a selected density value and objects having a density less than said selected density value. Said apparatus typically comprises a vessel containing a liquid having a density such that at least part of said objects having a density exceeding said selected density value will float therein; means to place said mixture into said vessel; means to reduce the effective density of at least a portion of said liquid to said selected density value, whereby said objects having a density exceeding said selected density value sink into said liquid and said objects having a density less than said selected density value remain afloat, said means to adjust the effective density comprising solid, bubble-like bodies having a density less than said selected density value and means for introducing said bodies into said liquid; and means for separately removing said objects having a density exceeding said selected density value and said objects having a density less than said selected density value from said vessel.

Another preferred apparatus according to the present invention typically comprises: a first vessel containing a first liquid having a density such that at least part of said objects having a density exceeding said selected density value will float therein; means to place said mixture into said first vessel; means to reduce the effective density of at least a portion of said first liquid to said selected density value, whereby said objects having a density exceeding said selected density value sink into said first liquid and said objects having a density less than said selected density value remain afloat, said means to adjust the effective density comprising solid, bubble-like bodies having a density less than said selected density value and means for introducing such bodies into said first liquid; first removal means for removing the objects floating in said portion of said first liquid; a second vessel connected to said first vessel via a port located in the lower portion of said first vessel, said second vessel containing a second liquid having a density such that at least part of said objects having a density exceeding said selected density value will float therein; means for directing the objects which sink in said first liquid through said port into said second vessel; and, second removal means for removing the objects floating in said second liquid.

The above-described apparatus may typically include third removal means for separately removing the objects which sink in said second liquid.

DRAWINGS

DETAILED DESCRIPTION

Figure 1:
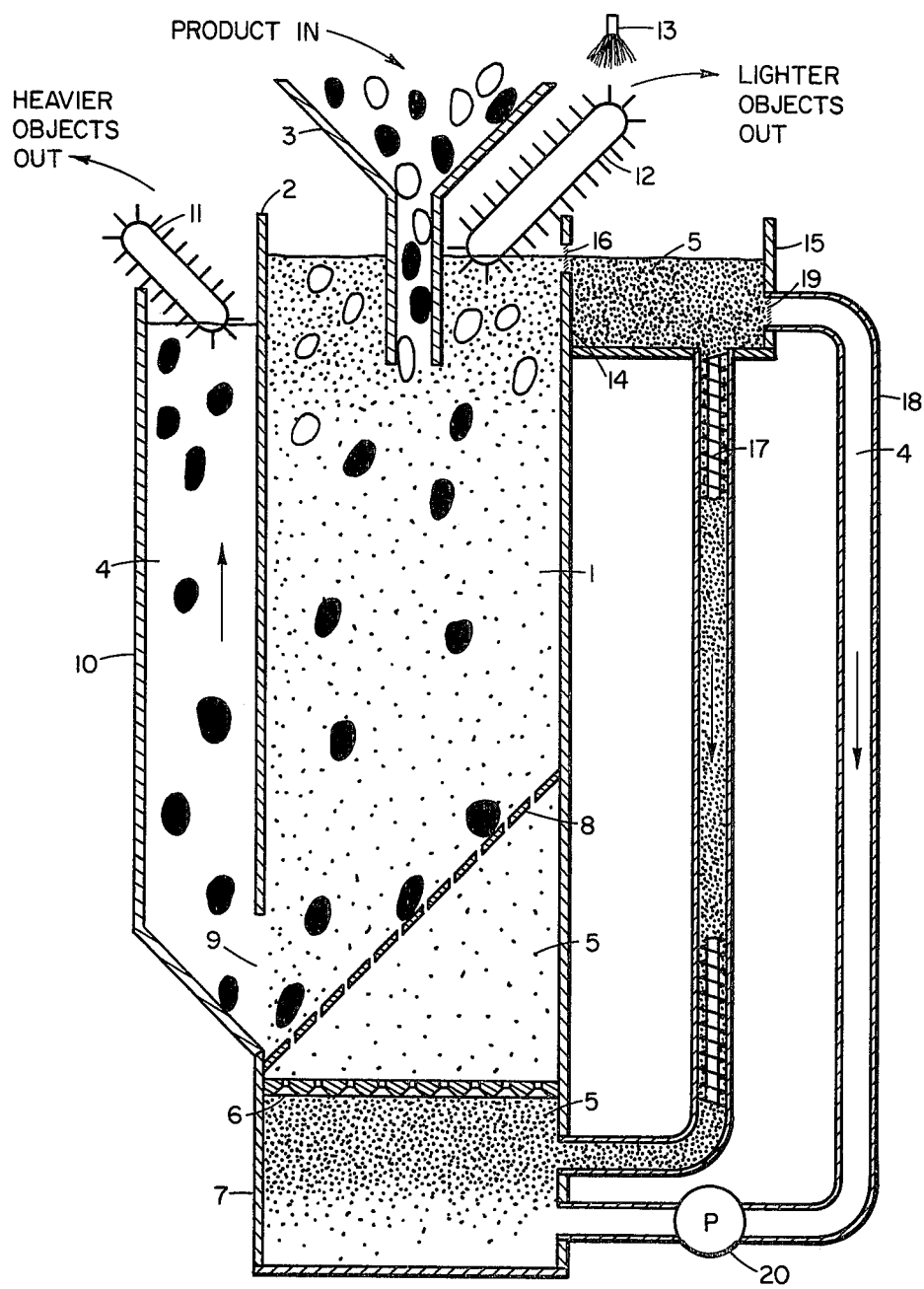
FIG. 1 is a schematic drawing illustrating one embodiment of the present invention being used to separate vegetables having differing densities.

FIG. 1 illustrates one preferred embodiment of the present invention. Physical separation of lighter objects (unshaded) from heavier objects (shaded) occurs in separation column 1, contained within tank 2. The objects or product to be separated are introduced into the separation column 1 by any conventional means such as hopper 3 or a screw conveyor (not shown). The point of introduction of the objects to be separated with respect to vertical position can range between the upper surface to nearly the bottom of the separation column.

The separation column 1 comprises a mixture of fluid medium 4 and solid, bubble-like bodies 5. The specific gravity of the fluid medium 4 alone is greater than the specific gravity of most objects to be introduced for separation. The specific gravity of the solid, bubble-like bodies 5 is less than the fluid medium 4. Thus, the bulk or apparent density of the separation column is lowered or reduced by introduction of the solid, bubble-like bodies 5 into the fluid medium 4. The solid, bubble-like bodies 5 may typically be solid spheres of plastic material such as polystyrene. Tank 2 may be of any convenient shape and material capable of holding the fluid in the separation column 1, although process feed and hydraulic stability are enhanced by using a cylindrical cross-section. The height of the separation column 1 will vary with process parameters, but is typically a length equivalent to several column diameters.

The solid, bubble-like bodies may be introduced into the separation column 1 through a feed plate 6 which separates tank 2 from the collection tank 7. Tank 7 serves to receive and store recycled solid, bubble-like bodies 5 and fluid medium 4, as will be described below.

The apparent density of the column 1, i.e., the density of the fluid-solid bubble-like body mixture, may be adjusted either before or after the objects to be separated have been added. The column apparent density selected will be that density value which is intermediate the densities of the two fractions of objects it is desired to separate. That is, the apparent density of the column is adjusted so that one fraction of the objects has a density greater than the apparent density, and therefore sink to the bottom or lower portion of the column, and the other fraction, which it is desired to separate out, has a density less than the column apparent density, and therefore remains afloat.

Screen 8, or, alternatively, a set of inclined parallel bars (not shown), is provided in the lower portion of tank 2 to direct the objects of greater density (i.e. negatively buoyant) to port 9, which connects the separation column 1 with fluid column 10. The inclined screen 8 requires openings large enough to permit essentially unrestricted upward movement of the solid, bubble-like bodies 5, and sufficiently small openings to prevent passage of the heavier objects downwardly through the screen. Negatively buoyant objects will accumulate at the lowest elevation on the inclined screen and the objects nearest port 9 will be pressed into fluid column 10 by the weight of the objects at higher elevation on the inclined screen 8. Fluid column 10 contains fluid medium 4 with essentially no solid, bubble-like bodies 5 therein.

Solid, bubble-like bodies 5 emerging from the feed plate 6 into separation column 1 rise vertically, which essentially precludes entry into fluid column 10 by reason of geometrical configuration. Thus, fluid column 10 contains essentially fluid medium 4 and the heavier objects that have been separated. Since fluid medium 4 has a greater specific gravity than most of the heavier objects, the heavier objects will rise in fluid column 10 due to positive buoyancy.

Heavier objects that have descended through the separation column 1, entered column 10 through port 9, and subsequently ascended can be removed from the surface of fluid column 10 by any conventional means such as an endless-belt conveyor 11. Objects of lighter density which have risen to the surface of the separation column 1, by virtue of their positive buoyancy can be removed from tank 2 by any conventional means, such as an endless conveyor 12. Solid, bubble-like bodies which may adhere to or intermingle with the lighter objects being removed from tank 2 can be removed by any conventional means such as a spray wash 13. Note that the spray wash 13 can be located such that the solid, bubble-like bodies 5 are returned to the normal process cycle.

The solid, bubble-like bodies 5 that have ascended from the feed plate 6 to the top of the separation column 1 by virtue of their positive buoyancy, as well as fluid medium 4, pass over a weir 14 into tank 15. A screen 16 with mesh size large enough to permit essentially unrestricted passage of the solid, bubble-like bodies 5 and small enough to prevent passage of the lighter objects that have been separated is located between tanks 2 and 15.

The solid, bubble-like bodies 5 are returned or recycled from tank 15 to collection tank 7 by any conventional means such as a screw conveyor 17. Fluid medium 4 is returned or recycled to collection tank 7 through an independent piping system 18 to provide flexibility in process control. A screen 19 of mesh size small enough to prevent passage of the solid, bubble-like bodies 5 is located between tank 15 and the fluid medium return system 18. A controllable pump 20 in the fluid medium return system permits control of the bubble feed rate through feed plate 6 by pressurizing collection tank 7.

Figure 5:
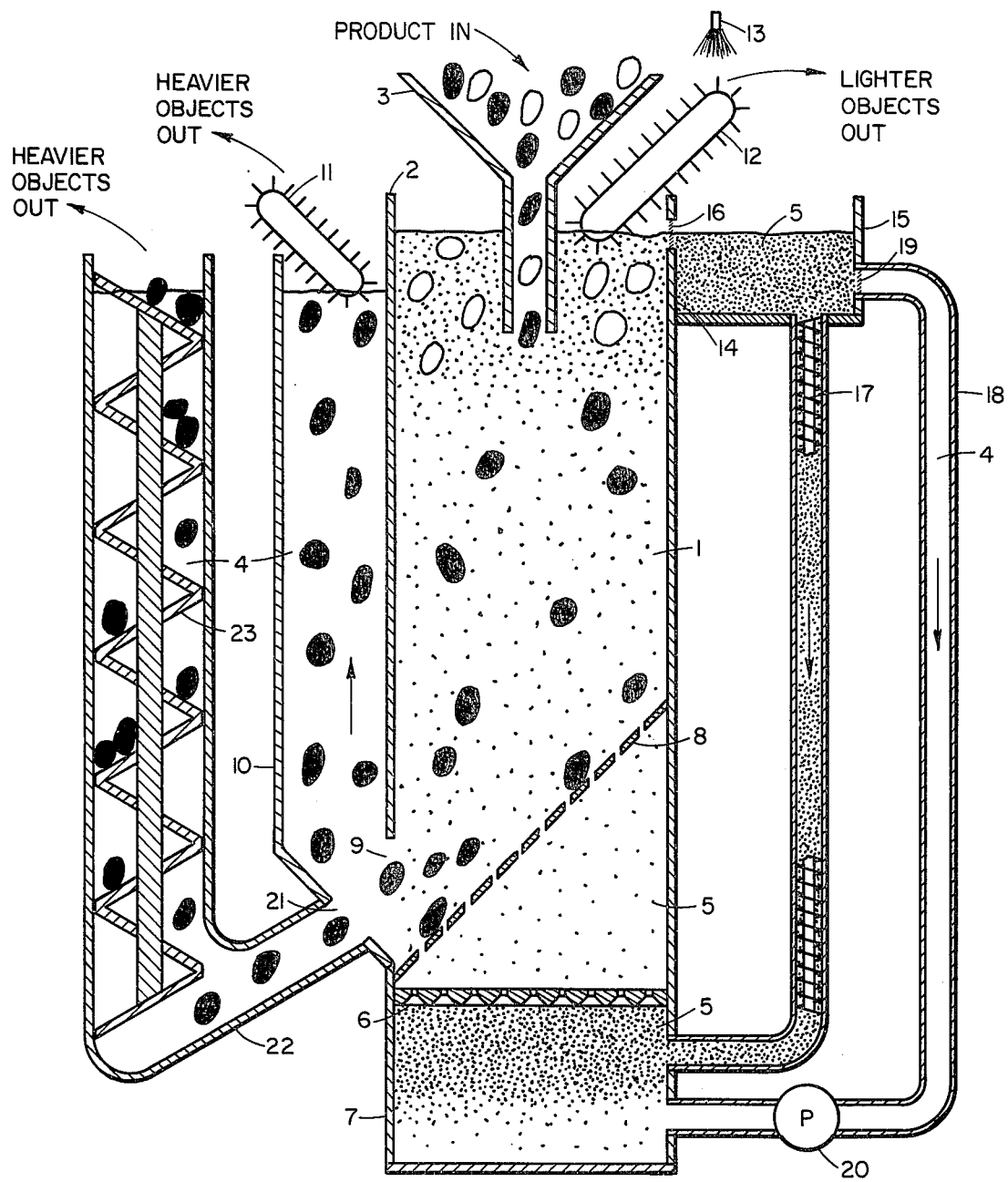
FIG. 5 is a schematic drawing illustrating another embodiment of the invention being used to separate vegetables having differing densities.

Referring now to FIG. 5, as an optional feature, if desired, any heavy objects which do not float in fluid column 10 can be removed through optional port 21 located near and below port 9. These heavy objects may be removed through a separate fluid column 22 (containing fluid medium 4) through the use of any convenient means such as a screw conveyor 23. In this embodiment the objects would thus be separated into three density fractions.

If desired, as another optional feature, the product streams emerging on conveyors 11 or 12 may each be subjected to a second separation step, or stage, to further classify the products according to density. For these second passes the bulk density of the column may be altered by feeding more or fewer solid, bubble-like bodies so that the selectivity of the separation is increased. Also, for separation of the objects into several density classifications, e.g., different degrees of ripeness, etc., more than one fluid-solid, bubble-like body mixture zone (not shown) can be provided within a single tank arrangement, with a variety of apparent column densities presented to the objects being classified. Any number of product streams can thus be obtained by using multiple zones.

Figure 2:
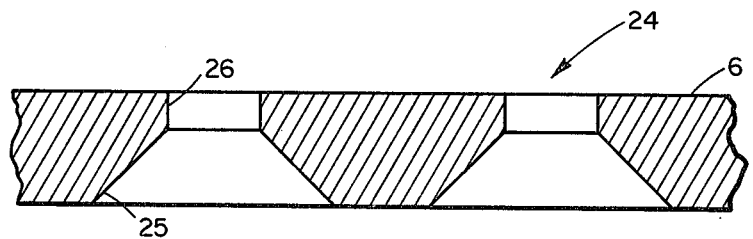
FIG. 2 is a sectional view of a part of a typical feed plate suitable for feeding solid, bubble-like bodies into a separation vessel according to the present invention.

FIG. 2 shows a preferred feed plate hole design which permits stable and controllable feeding of the solid, bubble-like bodies 5 from collection tank 7 into separation column 1. Each hole 24 comprises a frustoconical bottom portion 25 surmounted by a cylindrical upper portion 26. Each hole thus comprises an inverted hopper feeder which, due the upward fluid pressure of fluid 4 resulting from the pressure exerted by pump 20, functions in accordance with well-known operational principles governing conventional gravity feed hoppers. Using these principles together with the known relationships between the many process variables, discussed elsewhere herein, preferred hole dimensions and spacing can be determined for the particular system being utilized.

The upward flow of fluid through the feed plate holes carries solid, bubble-like bodies with it and provides an excellent means for controlling the rate of feed of the bodies into the separation column. With properly sized holes, no bodies will move through the holes when the fluid flow is stopped (due to bridging action). Increasing the fluid flow rate forces an increasing number of bodies through the feed plate holes.

We have found that vibration of the feed plate perpendicular to the direction of flow, when used in combination with the above-described control techniques, provides increased control sensitivity.

Figure 3:
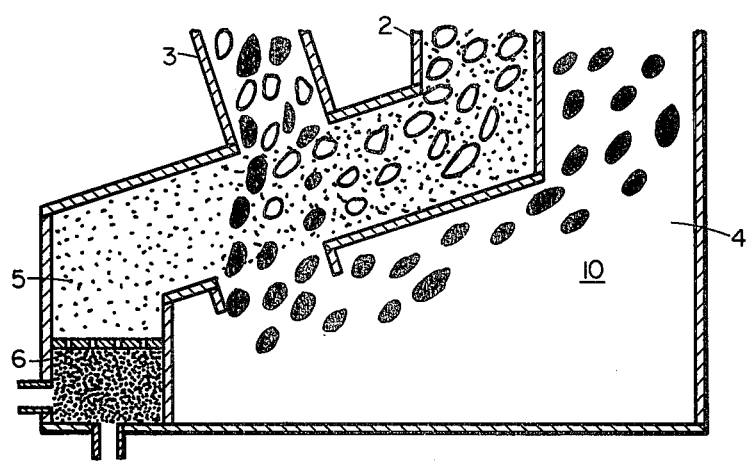
FIG. 3 is a schematic drawing illustrating the significant features of another embodiment of the present invention being used to separate vegetables of different densities.

FIG. 3 illustrates another preferred arrangement for the separation column of the present invention. To avoid redundant explanation, identical numbers have been used to identify features corresponding to those designated in FIG. 1. The significant distinction in the device shown in FIG. 3 is that a portion of the separation column 1 is set at an incline from the vertical. As shown, addition of the objects to be separated at a point along this inclined portion will permit the objects of greater density to fall to a lower portion of the separation column and exit the column without the necessity of placing a screen over the feed plate, since these heavier objects do not fall toward the feed plate as they do in the embodiment of FIG. 1.

Note that the solid, bubble-like bodies 5 can be separated from the objects of lesser density which float along with the bodies in the upper portion of the separation column, and that the bodies 5 and the fluid medium 4 can be recycled back to collection tank 7, and that the objects of greater density, which float in the upper portion of tank 10 and the objects of lesser density, which float in the upper portion of tank 3 can be separately removed and collected. All of the above-noted steps can be accomplished by conventional methods and means (not shown), such as, for example, those shown in FIG. 1.

The fluid separation column of the present invention tends toward self-stability when solid bubble-like bodies are used to vary the density, provided the velocity and feed rate of the bubble-like bodies are kept within reasonable limits. Variations in the rate of feed across the feed plate are overcome by the bubble-like bodies' tendency to distribute evenly throughout any horizontal plane of the fluid separation column. Bubble feed from a point source in the center of the column would ultimately fill the entire cross-sectional area of the column if adequate length for ascent is provided.

With regard to the solid, bubble-like bodies, there are few constraints as to the materials, compositions, sizes or shapes which can be used, provided the density of the bodies is finitely different from that of the fluid medium. Obviously the only real constraint will be the need to select bodies having a size, shape, composition, density, etc., which, when combined with the other system parameters, e.g., fluid medium density and viscosity, available feed rate, height of the separation tank, etc., will permit adjustment of the apparent column density to a value intermediate the density ranges of the two fractions of objects which are to be separated. Other than this constraint, the solid, bubble-like bodies can be of any convenient size, shape, material, composition, etc.

Although the bubble-like bodies are referred to as being "solid", the use of this term is not meant to infer that the bodies cannot be hollowed out or that they must be comprised of the same material throughout. The term "solid" is used merely to define the physical state of the boundary surface of the bodies, and thereby distinguish these bodies from true liquid or gaseous bubbles. Thus, encapsulated gases, solids, or liquids, since they possess a solid boundary surface, would be included within the intended meaning of the term solid, bubble-like bodies, and in fact would constitute attractive, if not preferred embodiments. The present invention also emcompasses systems wherein the "solid, bubble-like bodies" are composed of the solid state of the same material which comprises the liquid medium. For example, solid, bubble-like bodies comprised of ice in a liquid medium comprised of water.

Although it is possible to use solid, bubble-like bodies of various shapes, including cylinders, disks, etc., a preferred shape is spherical, since the use of spheres greatly enhances separation column stability, and spheres are less likely to agglomerate or attach to the objects being separated. Additionally, the stability of the feed rate of the bodies through the feed plate is greatly enhanced through the use of spherical, solid, bubble-like bodies. It should be noted that in certain circumstances it may be necessary, in order to achieve separation column stability, to reduce the rate of rise of the bodies in the column without changing their weight. This can be done by using bodies having surface projections which increase drag, although the above-described advantages of spherical bodies will be sacrificed.

As noted above, the solid, bubble-like bodies may be of any convenient size and composition, provided there is an appropriate match with other system parameters to give the required apparent column density. Synthetic thermoplastic polymeric materials such as, for example, polyethylene and polystyrene are attractive materials for constructing the bubble-like bodies because of their availability, relatively low cost, and appropriate density match with water or brine, the preferred fluid medium. We have found that when using water or brine as the fluid medium to separate objects having a specific gravity around 1.00, spherical Dowex ® ion exchange resin beads (polystyrene base) ranging in size from approximately 0.05 to 0.08 inch diameter perform satisfactorily. Although the resin beads are treated with di-vinyl benzene, this can easily be neutralized prior to use by methods well known in the art.

While polyethylene and polystyrene beads flow easily when dry, surface forces may cause them to agglomerate when wet, thus interfering with column and feed rate stability. The addition of surfactants, such as commercially available detergents, to the separation column will reduce these undesirable surface forces to an acceptable level. Also, the application of surface charges to the beads to produce repulsion forces may counteract these surface forces.

As previously discussed, the present invention utilizes a fluid medium in the separation column, and it is the alteration of the bulk density of this medium which permits separation of objects according to their buoyancy (i.e., density) in the mixture of fluid medium and solid, bubble-like bodies. As with the bubble-like bodies, there are no constraints as to which types of liquids are suitable, other than those dictated by the specific gravity (i.e., density) values of the objects to be separated. That is, any liquid which will yield the apparent column density required for separation when the solid, bubble-like bodies are added can be used satisfactorily in the present invention, provided, of course, it has no deleterious affects on the objects being separated.

In order to separate materials which have a specific gravity greater than 1.0, fluids having a specific gravity greater than that of water may be utilized as the basic fluid separating medium. For example, organic liquids such as chloroform or salt solutions such as aqueous calcium carbonate or sodium chloride could be used to separate solid materials having densities exceeding 1.2. Many other suitable liquids will occur to one skilled in the art for particular applications.

For articles having a specific gravity considerably less than 1.0, fluids with a specific gravity less than that of water may be utilized. For example, petroleum distillates, such as kerosene may be used to separate articles having densities in the range of approximately 0.6 to 0.75. A water-alcohol mixture may be used in separating objects having densities slightly less than 1.0.

As noted earlier, the viscosity of the liquid is an important parameter since it will affect the rate of rise of the solid, bubble-like bodies and the rate of sink of the heavier objects being separated. Although various liquids, such as, for example, glycerin, kerosene, or other petroleum-based liquids, silicone oils, aqueous salt solutions, etc., can be employed as the fluid separation medium, water or brine is the presently preferred fluid due to its availability and attractive density value (i.e., specific gravity 1.00–1.06) for many applications.

It should be noted that it may be desirable, in certain embodiments of this invention, to alter the properties of either or both the solid, bubble-like bodies and the fluid medium, especially their respective densities (i.e., specific gravities), with respect to column height (i.e., stratification of the column) and/or time. For example, it may be desirable to adjust the properties of the fluid or the solid, bubble-like bodies relative to column height, and thus establish several different density zones with product outlets for each zone, so that the products can be separated into several density classifications. One possible method of altering the density profile of the column with respect to height would be to allow solid, bubble-like bodies comprised of ice to rise in a liquid column comprised of warm water, with the ice melting as it ascends.

Obviously the present invention may be used in combination with prior art devices. A particularly preferred type of combination would be the use of the present invention with the device shown in U.S. Pat. No. 3,822,015 (Hsieh et al.). That is, a system wherein the density of the liquid column is altered by simultaneously feeding solid, bubble-like bodies and sparging gas bubbles into the column.

The improved variable density separator of the present invention includes numerous process variables that are either independent or that can be individually controlled by altering other independent variables. The single essential condition necessary for successful operation of the process is that a finite density difference exist between the solid, bubble-like bodies and the fluid separation medium. That is, the existence of a density differential permits the selective alteration of the specific gravity (i.e., bulk density) of the separation column, i.e., the mixture of fluid medium and solid, bubble-like bodies, to a value intermediate the specific gravities of the fluid and the bodies. This intermediate specific gravity value is selected such that the column will support (through buoyancy forces) the lighter density fraction of the objects being separated, but will not support the heavier objects which have a density greater than the apparent density of the column.

Many physical and/or chemical alterations can be made to the bodies or the fluid in the column which affect rate, sensitivity, etc. Several controllable process variables that could influence the performance or sensitivity of the present variable density separator invention are listed below: absolute density difference between the solid, bubble-like bodies and the fluid medium; relative velocity of the bodies rising in the fluid column; physical, chemical or electrical properties of the bodies, including material, electrical charge, state (solid or liquid), shape factors, size, and chemical properties of their surface (hydrophobic, hydrophillic, etc.); physical and chemical characteristics of the fluid medium, including viscosity, temperature, density, and hydraulic profile; feed rate and/or volume fraction of bodies in the fluid separation column; change in apparent density of the column with respect to height by altering properties of the bodies or the column; altering the properties of the bodies during residence in the column, e.g. partial melting; and geometric configuration and hydraulic characteristics, of the column, such as column height, location of product and/or bubble-like body input and output, column configuration (i.e., vertical or inclined).

The density of the solid, bubble-like bodies and the volume fraction of the separation column occupied by the bodies determine the apparent column density (i.e., the density of the mixture of fluid and bodies). The density and size of the bubble-like bodies and the viscosity of the fluid medium determine the rate of rise for the bodies. The "rate of sink" of the objects of greater density is determined by their size or surface configuration and, again, the fluid viscosity.

Since the bubble-like bodies are typically lighter than the fluid, the apparent column density is decreased by adding a larger volume of bodies in the fluid at any one time. The volume fraction of bodies can be controlled quite well by the feed plate, and this provides the fine tuning of the device. Of course, appropriate fluid and body densities must be preselected to operate the separator in the desired density range, i.e., the density range of the products to be separated.

Note that the bubble-like bodies' size does not affect the apparent density of the column, provided they are relatively small with respect to the size of the objects being separated. The body diameter must be determined for stability of the column. The greater the density difference between the solid, bubble-like body and the fluid, the smaller the body diameter must be to keep the rate of rise within proper limits. Thus, one selects a bubble-like body density to achieve the desired operating range and then selects a body diameter to provide stability during the process. If a suitable body diameter cannot be obtained, it is then conceivable to slow its rate of rise by increasing the fluid viscosity or adding appendages to the body. For most fluid, especially water, viscosity regulation may be prohibitively expensive. Other fluids, like glycerin, can be altered simply by controlling their temperature. Since the rate of rise is a function of diameter squared, the body size provides a greater effect on velocity than does fluid viscosity, which appears only as the first power.

The objects of greater density will fall through the column when the effective column density (i.e., bulk density or apparent density) becomes less than the density of the objects. The rate at which the objects fall depends on the degree of density difference and the size of the objects. Since the objects are generally larger than the solid, bubble-like bodies, they will usually fall through the column much faster than the bodies rise up through the column (i.e., the diameter squared relationship). This has been confirmed during our experiments to date.

The pertinent equations governing the operation of the process of the present invention will now be set forth and discussed in some detail.

$$SG_c = SG_f - (SG_f - SG_s)N \qquad (1)$$

where $SG_c$ = apparent density of the separation column (in specific gravity units); $SG_s$ = density of the solid, bubble-like bodies (in specific gravity units); $SG_f$ = density of the fluid (in specific gravity units); and N = number of bodies in the column (in volume fractions).

The apparent density of the column can be predicted by Equation 1. The column apparent density is seen to decrease linearly as the fraction of bodies in the fluid increases. The difference in density between fluid and bodies can also be seen as a controlling function. If this difference is large, then a smaller fraction of bodies is required.

The equation shows that there are three variables involved in obtaining a desired column apparent density: fluid density, body density, and volume fraction occupied by the bodies. The proper combination of these three variables can produce a wide range of column apparent densities.

For example, a 25% volume of high density polyethylene spheres ($SG_s$ = .96) in water ($SG_f$ = 1) will produce a column apparent density of 0.99. The graph below illustrates the results.

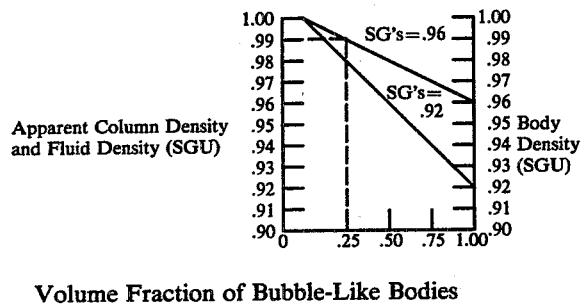

Volume Fraction of Bubble-Like Bodies $$V_t = \frac{2}{9} \frac{R^2}{\mu} (v_s - v_w) \qquad (2)$$

where $V_t$ = terminal velocity of the bodies (ft/sec); R = body radius (ft); $\mu$ = fluid viscosity (lb-sec/ft²); $v_s$ = body density (lb/ft³); and $v_w$ = fluid density (lb/ft³).

The terminal velocity of the bodies is an important parameter for column stability. This velocity must be kept low in order to reduce turbulence in the column. A value on the order of one inch per second is satisfactory.

The density difference ($v_s - v_w$) is fixed by considerations affecting Equation 1. This leaves only the body radius and fluid viscosity as the controlling variables. The radius is a second power term and thus a much stronger control on the terminal velocity. For some fluids, temperature is a convenient method of adjusting viscosity. Body shapes other than spheres can retard ascent by adding drag.

Equations 3 and 4 can be used to determine the approximate size and distribution of holes required in the feed plate.

$$N_o = \frac{(V_t + V_w)A}{V_s} N \qquad (3)$$

$$N_{o_{max}} = \frac{0.62 \pi D^2}{4} \frac{(V_t + V_w)h}{V_s} \qquad (4)$$

where $N_o$ = number of bodies required per second; $V_t$ = terminal velocity of body (ft/sec); $V_w$ = velocity of fluid in column (ft/sec); $V_s$ = volume of each body (ft³); A = cross-sectional area of column (ft²); h = number of holes in feed plate; and D = hole diameter (ft.).

Equation 3 must be used to determine the total number of bodies required (per second) to obtain a desired apparent column density (N determined from Equation 1). Equation 4 may then be used to determine the number of holes required based on their known diameter (D).

The separation process and apparatus described above have been used effectively in separating many types of solid items according to density. The separation technique of this invention may be used on various fruits, vegetables and other foodstuffs to separate the materials according to ripeness and defects. Typical examples of items which may be susceptible to this type of separation technique would include virtually any fruit or vegetable, such as tomatoes, lima beans, dates, nuts, cherries, plums, pears, watermelons, and many other foodstuffs. Any material which has a density relatively close to that of a liquid can be separated from other articles having differing densities by this process and apparatus.

Citrus fruit growers will find the process and apparatus of this invention to be useful in separating the juicy, more valuable product suitable for fresh consumption from the pithy type of product which may be overripe and contain less of the desirable juicy characteristics. Peas, beans and other vegetables which are harvested without respect to the individual degree of ripeness of the individual vegetables may be separated based on the moisture content which directly influences the specific gravity or density of the vegetable. The process can, of course, be combined with a washing of the vegetables or other articles being separated and possibly quick cooling of the vegetables to aid in preservation thereof. Similarly, sorting of eggs may be possible due to differences in densities of the eggs as they age.

Weed seeds might be separated from the more valuable grain and other type of seeds sought as products. Separations of types of grain seeds may also be possible if adequate differences exist in the respective densities of the types of grain.

The present invention also has application to the fishing industry. This process and apparatus should be suitable for separating out trash fish (e.g., the shrimp industry), for classification of fish by species, and for separation of culls and bones from processed fish meat.

In the area of forest products, the increased sensitivity of the present device should permit improved separation of bark chips from wood chips, and with regard to industrial or municipal waste products, separation of waste materials according to density (e.g. metals, plastics, etc.) should be possible.

Figure 4:
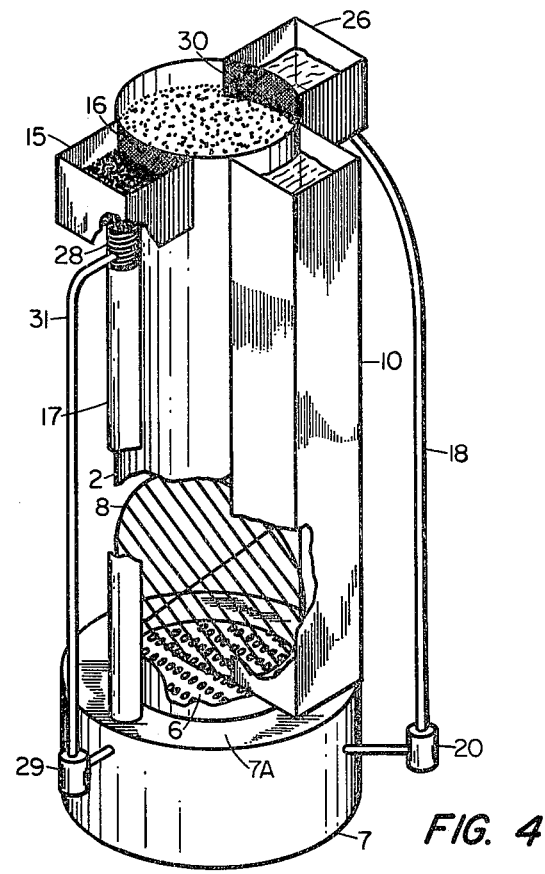
FIG. 4 is an isometric view illustrating an embodiment of the present invention which was used to separate potatoes having differing densities.

The following examples are presented for purposes of explanation only, and are not intended as limitations on the scope of the invention in any way. In the following examples an embodiment of the invention similar to that shown in FIG. 4 was used. The identification numbers correspond generally to those used to identify similar elements in FIG. 1. A cylindrical, acrylic plastic (one-eighth inch thick) tube, four feet high and twelve inches in diameter was used as the separation tank 2. A six inch by six inch rectangular column four feet high made from acrylic plastic (one-eighth inch thick) was attached to the outer periphery of tank 2 as shown so as to cover a port of approximately similar dimensions located one inch from the bottom of the separation column, and served as fluid tank 10. An inclined bar screen 8 was used to direct the heavier objects from the separation column into tank 10 and to prevent the objects from sinking on top of the feed plate. The force of gravity caused the objects to press themselves into column 10. A standard garden hose 18, (five eighths inch diameter) was used to recycle water from an auxiliary tank 26 to one-fourth horsepower centrifugal pump 20, and from the pump back to collection tank 7. As shown, auxiliary tank 26, measuring 10 inches, by 10 inches, by 8 inches deep was attached to the upper portion of the outer periphery of tank 2 at a location approximately 180° from tank 15. In this experimental device tank 7 comprised a twenty-two and one-half inch diameter, eighteen inch high steel drum which was obtained by cutting a conventional fifty five gallon steel drum approximately in half. The open end of the drum was covered by a circular 22½ inch diameter metal plate 7A which had an approximately centrally located 12 inch diameter hole and a two and one-half inch diameter hole cut near its periphery as shown. The feed plate 6, comprising a roughly circular 12 inch diameter, three-eighths inch thick acrylic sheet with holes drilled through it, was bolted and sealed to the central hole of the metal plate 7A, and the bottom of the separation column tube i.e., tank 2, was glued to the feed plate. The metal cover plate 7A, acrylic feed plate 6, column tube 2 assembly was then sealed to the top of the steel drum using a metal cinch, and the fluid medium (in these examples water) was fed through hose 18. The feed plate 6 was constructed from three-eighths inch thick acrylic plastic and the holes comprised upper cylindrical portions five-sixteenths inch in diameter and one-eighth inch deep surmounting frusto-conical portions approximately one-eighth inch deep and ¼ inch in diameter at the bottom surface. The holes were spaced approximately one inch apart.

In these examples the solid, bubble-like bodies comprised spherical, plastic, Dowex ® ion-exchange resin beads having a specific gravity of approximately 0.90 and a diameter in the range of five hundredths to eight hundredths inch. (These resin beads had been treated with di-vinyl benzene and it was necessary to neutralize them with methyl alcohol before use.)

A standard two and one half inch diameter tube 17 extending from the similar size hole in metal plate 7A to bead overflow box 15 served as the recycle path for the solid, bubble-like bodies.

Tube 17 was connected to a port in the bottom of bead overflow box 15 via a conventional coanda nozzle 28 (three fourths inch throat). The coanda nozzle 28 was driven by a separate pump 29 through a 3/8 inch garden hose 31 which was connected to a port in tank 7. The nozzle drew the beads, and some excess water, into recycle tube 17 so that they were returned to collection tank 7. The nozzle was used in place of alternative recirculation means (e.g. a screw conveyor) because of its simplicity of operation.

Bead overflow box 15 and water overflow box 26 each comprised a ten inch square, eight inch deep, acrylic plastic box open at the top, with three sides of the box constructed of acrylic plastic and one side formed of wire mesh screen. Bead overflow box screen 16 had a mesh size large enough to permit the particular plastic beads being used to pass through while retaining the objects being separated. Water overflow box screen 30 was comprised of conventional household door screen so that no plastic beads would pass through. Water was returned to tank 7 from an outlet in the bottom of water overflow box 26 through hose 18 and pump 20 as shown.

"V" notch openings adjustable to three to five inches deep were cut out of the upper periphery of separation tank 2, at two locations as shown, and bead overflow box 15 and water overflow box 26 were affixed at these respective openings with their screened sides adjacent the tank.

In order to begin operation of this experimental device the metal cover plate 7A, with feed plate 6 and separation tank 2 attached, was removed from tank 7 and the tank was filled about one half full with the neutralized Dowex ® ion exchange resin beads. When the metal cover plate-feed plate-separation tank assembly was reattached to tank 7, the tank, and separation tank 2, and consequently tank 10, were filled with water. Pump 20 was then turned on so that the water pressure developed in tank 7 was sufficient to initiate feeding of the beads through the feed plate into separation tank 2. By adjusting the pump pressure, the number of beads being fed into the separation column could be increased or decreased at will.

The Dowex ® resin beads rose to the surface of the water column in tank 2 and passed through screen 16 into bead overflow box 15. By adjusting the water pressure from hose 31 it was possible to adjust the rate of flow at which the beads were drawn by the coanda nozzle into pipe 17, and thus maintain a steady recycle stream of beads back into collection tank 7. Water from tank 2 passed into water overflow box 26 and then through hose 18 to pump 20 and on to tank 7. Thus, a continuous recycling of beads and water was achieved.

In this experimental device the objects to be separated were fed by hand into the top of tank 2. The objects could be fed either before or after the bead and water recycle systems were operating. When a sufficient number of beads were present in the water column, its effective density (i.e., the specific gravity of the water-bead mixture) was lowered, so that when the effective column density reached a value intermediate to that of the lighter and heavier objects, the lighter objects floated while the heavier objects sank to the bottom of tank 2 and were deflected by screen 8 into tank 10. The heavier objects then rose to the surface of the water in the tank 10 since the absence of beads in tank 10 resulted in a higher specific gravity (i.e., the density of the water in column 10, without beads, was greater than that of the water-bead mixture in column 2, and was greater than that of the heavier objects).

EXAMPLE 1

Using water as the fluid separation medium and ping pong balls filled with various amounts of glycerine as the objects to be separated, it was found that ping pong balls varying in density by as little as approximately 0.005 specific gravity units could be separated using this device.

EXAMPLE 2

A brine solution containing approximately 11% sodium chloride by weight in water was used, and the bead feed rate was adjusted so that the separation column contained approximately 5% to 10% beads by volume at any one time.

Potatoes having "hollow hearts" (i.e. defective potatoes) were successfully separated from sound potatoes (i.e. no "hollow heart"). That is, the "hollow heart" potatoes remained afloat in separation column 2, while the sound potatoes sank and either remained at the bottom of column 2 or 10 or rose in column 10, depending on their density.

Upon subsequent measurement it was determined that the "hollow heart" potatoes measured approximately 1.071–1.098 specific gravity units while the sound potatoes measured approximately 1.108–1.121 specific gravity units.

Although the present invention has been described in connection with certain specific embodiments and examples, such description is meant to be illustrative only and not restrictive or limiting, and it is to be understood that various changes and modifications may be resorted to by those skilled in the art without departing from the spirit and scope of the invention.

We claim:

1. A method for separating objects having a density greater than a selected density value from objects having a density less than said selected density value, comprising:
   (a) providing a separation vessel having an upper and lower portion, said vessel containing a liquid having a density exceeding said selected density value;
   (b) reducing the apparent density of the liquid to said selected density value by introducing solid, bubble-like bodies having a density less than that of the liquid into the lower portion of the vessel and permitting them to rise therethrough;
   (c) introducing the objects to be separated into the separation vessel and permitting the objects having a density greater than the apparent density of the liquid to sink to the lower portion of the vessel, while the objects having a density less than said selected density value float in the upper portion of the vessel; and
   (d) separately removing the higher density objects in the lower portion and the lower density objects in the upper portion from the separation vessel.

2. The method of claim 1 wherein said liquid is water.

3. The method of claim 2 wherein said solid, bubble-like bodies are comprised of ice.

4. The method of claim 2 wherein said solid, bubble-like bodies are comprised of polystyrene having a density of about 0.90, and wherein said bodies are essentially spherical in shape and have a diameter in the range of from about 0.05 inch to 0.08 inch.

5. The method of claim 1 wherein substantially all of said solid, bubble-like bodies are of a smaller size than the smallest of the objects being separated.

6. The method of claim 1 wherein said liquid has a specific gravity no greater than 1.00.

7. The method of claim 1 wherein said solid, bubble-like bodies are essentially spherical in shape.

8. The method of claim 1 wherein said solid, bubble-like bodies are comprised of a thermoplastic resin material.

9. The method of claim 1 wherein any objects having a density exceeding that of said liquid prior to introduction of the solid, bubble-like bodies are separately removed in a preliminary separation step.

10. The method of claim 1 wherein the apparent density of the liquid is further reduced by sparging a gas into the lower portion of the vessel.

11. The method of claim 1 wherein the apparent density of the liquid is continuously maintained at said selected density value by introducing the solid, bubble-like bodies on a continuous basis.

12. The method of claim 11 wherein the solid, bubble-like bodies which have risen through the liquid are continuously recycled back to the point of introduction into the lower portion of the vessel so that they may again be permitted to rise therethrough.

13. A method for separating articles according to density, comprising:
   (a) introducing a mixture of articles having various densities into a vessel containing a liquid;
   (b) reducing the effective density of said liquid to a value intermediate to the range of densities of said articles it is desired to separate by introducing solid, bubble-like bodies having a density less than that of said liquid into the lower portion of said liquid and permitting them to rise therethrogh, thereby causing separation of said articles through buoyancy effects;
   (c) removing a first portion of said articles having a density lower than said reduced effective density from the uppr portion of said liquid, and separately removing a second portion of said articles having a density exceeding said reduced effective density from the lower portion of said liquid.

14. A method of separating articles into a plurality of groupings according to density, comprising the steps of:
   (a) introducing the articles into a first separation vessel containing a liquid having a density exceeding that of at least a portion of the articles;
   (b) removing any of the articles which sink in said liquid from said first vessel as one of said groupings;
   (c) introducing solid, bubble-like bodies having a density less than that of the liquid into the lower portion of said liquid and permitting them to rise therethrough to thereby reduce the effective density of said liquid to a value below the density of a second grouping of said articles but above the density of a third grouping of said articles, so that said second grouping sinks in the liquid leaving said third grouping afloat;
   (d) separately removing said third grouping of articles from said first vessel;
   (e) causing said second grouping of articles to move into a second separation vessel containing said liquid, but without said solid, bubble-like bodies, whereby said second grouping floats in said liquid; and,
   (f) separately removing said second grouping of articles from said second vessel.

15. Apparatus for separting according to density a mixture of objects having a density exceeding a selected density value and objects having a density less than said selected density value, comprising:
   (a) a vessel containing a liquid having a density exceeding said selected density value will float therein;
   (b) means to place said mixture into said vessel;

(c) means to reduce the effective density of said liquid to said selected density value, whereby said objects having a density exceeding said selected density value sink into said liquid and said objects having a density less than said selected density value remain afloat, said means to adjust the effective density comprising solid, bubble-like bodies having a density less than said selected density value and means for introducing said bodies into the lower portion of said liquid, thereby permitting said bodies to rise therethrough; and (d) means for separately removing said objects having a density exceeding said selected density value and said objects having a density less than said selected density value from said vessel.

16. The apparatus of claim 15, including means for continuously recycling the solid, bubble-like bodies which have risen through the liquid back to the point of introduction into the lower portion of the liquid so that they may again be permitted to rise therethrough.

17. Apparatus for separating according to density a mixture of objects having a density exceeding a selected density value and objects having a density less than said selected density value, comprising:

(a) a first vessel containing a first liquid having a density such that at least part of said objects having a density exceeding said selected density value fill float therein;

(b) mens to place said mixture into said first vessel;

(c) means to reduce the effective density of said first liquid to said selected density value, whereby said objects having a density exceeding said selected density value sink into said first liquid and said objects having a density less than said selected density value remain afloat, said means to adjust the effective density comrprising solid, bubble-like bodies having a density less than said selected density value and means for introducing said bodies into the lower portion off said first liquid, thereby permitting said bodies to rise therethrough;

(d) first removal means for removing the objects floating in said first liquid;

(e) a second vessel connected to said first vessel via a port located in the lower portion of said first vessel, said second vessel containing a second liquid having a density such that at least part of said objects having a density exceeding said selected density value will foat therein;

(f) means for directing the objects which sink in said first liquid through said port into said second vessel; and (g) second removal means for removing the objects floating in said second liquid.

18. The apparatus of claim 17, including third removal means for separately removing the objects which sink in said second liquid.

* * * * *